United States Patent
Grant (10) Patent No.: US 11,550,574 B2
(45) Date of Patent: Jan. 10, 2023

(54) GENERATING A VECTOR PREDICATE SUMMARY

(71) Applicant: Arm Limited, Cambridge (GB)

(72) Inventor: Alasdair Grant, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/273,919

(22) PCT Filed: Oct. 17, 2019

(86) PCT No.: PCT/GB2019/052969
§ 371 (c)(1),
(2) Date: Mar. 5, 2021

(87) PCT Pub. No.: WO2020/128414
PCT Pub. Date: Jun. 25, 2020

(65) Prior Publication Data
US 2021/0334102 A1 Oct. 28, 2021

(30) Foreign Application Priority Data
Dec. 20, 2018 (GB) ...................................... 1820841

(51) Int. Cl.
*G06F 9/30* (2018.01)
(52) U.S. Cl.
CPC ................................ *G06F 9/30036* (2013.01)
(58) Field of Classification Search
None
See application file for complete search history.

(56) References Cited

U.S. PATENT DOCUMENTS

| | | | |
|---|---|---|---|
| 2008/0247413 A1* | 10/2008 | Ono | H04L 1/08 370/432 |
| 2010/0312988 A1 | 12/2010 | Björklund et al. | |
| 2013/0024654 A1* | 1/2013 | Gove | G06F 9/30032 712/7 |

(Continued)

OTHER PUBLICATIONS

International Search Report and Written Opinion of the ISA for PCT/GB2019/052969, dated Dec. 6, 2019, 13 pages.

(Continued)

*Primary Examiner* — John M Lindlof
(74) *Attorney, Agent, or Firm* — Nixon & Vanderhye P.C.

(57) ABSTRACT

Apparatuses and methods of operating such apparatuses are disclosed. Vector processing circuitry performs data processing in multiple parallel processing lanes, wherein the data processing is performed in a subset of the multiple parallel processing lanes determined by bit values of a vector predicate which are set. Predicate monitoring circuitry is responsive to the vector predicate to generate a predicate summary value in dependence on the bit values of the vector predicate. A first value of the predicate summary value indicates that a sparse condition is true for the vector predicate, the sparse condition being true when the bit values of the vector predicate comprise a set bit corresponding to a vector element at a higher index immediately followed by a non-set bit corresponding to a vector element at a lower index. A second value of the predicate summary value indicates that the sparse condition is not true for the vector predicate. Improved predicate controlled vector processing is thus supported.

20 Claims, 10 Drawing Sheets

(56) References Cited

U.S. PATENT DOCUMENTS

| | | |
|---|---|---|
| 2014/0040601 A1 | 2/2014 | Fleischer et al. |
| 2014/0095828 A1* | 4/2014 | Plotnikov ............ G06F 15/8084 |
| | | 712/5 |
| 2015/0227367 A1 | 8/2015 | Eyole-Monono et al. |
| 2016/0092398 A1 | 3/2016 | Gonion et al. |
| 2018/0046459 A1 | 2/2018 | Burgess et al. |

OTHER PUBLICATIONS

Search Report for GB1820841.3, dated Jun. 21, 2019, 4 pages.
Robert Bedichek, "Some Efficient Architecture Simulation Techniques," Proceedings of the Winter 1990 USENIX Conference, Jan. 22-26, 1990, 12 pages.

* cited by examiner

GENERATING A VECTOR PREDICATE SUMMARY

This application is the U.S. national phase of International Application No. PCT/GB2019/052969 filed 17 Oct. 2019, which designated the U.S. and claims priority to GB Patent Application No. 1820841.3 filed 20 Dec. 2018, the entire contents of each of which are hereby incorporated by reference.

The present techniques relate to the field of data processing.

In a data processing apparatus which comprises vector processing circuitry which performs data processing in multiple parallel processing lanes it may be arranged that the data processing is selectively only performed in a subset of the multiple parallel processing lanes. Further, control over this operation of the vector processing circuitry may be provided by means of a vector predicate which is typically provided as a number of bit values corresponding to the number of multiple parallel processing lanes and of which the bit values can be set to indicate whether a particular processing lane should be active. Accordingly, the vector processing circuitry may perform its data processing operations differently in dependence on a particular vector predicate received in association with that iteration of vector processing, activating and deactivating processing lanes in accordance with the bit values of the vector predicate provided to control that iteration.

At least some examples provide an apparatus comprising: vector processing circuitry to perform data processing in multiple parallel processing lanes, wherein the data processing is performed in a subset of the multiple parallel processing lanes determined by bit values of a vector predicate which are set; and predicate monitoring circuitry responsive to the vector predicate to generate a predicate summary value in dependence on the bit values of the vector predicate, wherein a first value of the predicate summary value indicates that a sparse condition is true for the vector predicate, the sparse condition being true wherein the bit values of the vector predicate comprise a set more-significant bit immediately followed by a non-set less-significant bit, and a second value of the predicate summary value indicates that the sparse condition is not true for the vector predicate.

At least some examples provide a method comprising: performing vector data processing in a subset of multiple parallel processing lanes determined by bit values of a vector predicate which are set; and generating a predicate summary value in dependence on the bit values of the vector predicate, wherein a first value of the predicate summary value indicates that a sparse condition is true for the vector predicate, the sparse condition being true wherein the bit values of the vector predicate comprise a set more-significant bit immediately followed by a non-set less-significant bit, and a second value of the predicate summary value indicates that the sparse condition is not true for the vector predicate.

At least some examples provide an apparatus comprising: means for performing vector data processing in a subset of multiple parallel processing lanes determined by bit values of a vector predicate which are set; and means for generating a predicate summary value in dependence on the bit values of the vector predicate, wherein a first value of the predicate summary value indicates that a sparse condition is true for the vector predicate, the sparse condition being true wherein the bit values of the vector predicate comprise a set more-significant bit immediately followed by a non-set less-significant bit, and a second value of the predicate summary value indicates that the sparse condition is not true for the vector predicate.

At least some examples provide a computer program for controlling a host data processing apparatus to provide an instruction execution environment comprising: vector processing logic to perform data processing in multiple parallel processing lanes, wherein the data processing is performed in a subset of the multiple parallel processing lanes determined by bit values of a vector predicate which are set; and predicate monitoring logic responsive to the vector predicate to generate a predicate summary value in dependence on the bit values of the vector predicate, wherein a first value of the predicate summary value indicates that a sparse condition is true for the vector predicate, the sparse condition being true when the bit values of the vector predicate comprise a set bit corresponding to a vector element at a higher index immediately followed by a non-set bit corresponding to a vector element at a lower index, and a second value of the predicate summary value indicates that the sparse condition is not true for the vector predicate.

The present techniques will be described further, by way of example only, with reference to embodiments thereof as illustrated in the accompanying drawings, to be read in conjunction with the following description, in which.

In one example herein there is an apparatus comprising: vector processing circuitry to perform data processing in multiple parallel processing lanes, wherein the data processing is performed in a subset of the multiple parallel processing lanes determined by bit values of a vector predicate which are set; and predicate monitoring circuitry responsive to the vector predicate to generate a predicate summary value in dependence on the bit values of the vector predicate, wherein a first value of the predicate summary value indicates that a sparse condition is true for the vector predicate, the sparse condition being true wherein the bit values of the vector predicate comprise a set more-significant bit immediately followed by a non-set less-significant bit, and a second value of the predicate summary value indicates that the sparse condition is not true for the vector predicate.

The vector processing circuitry of the apparatus is arranged to perform data processing in multiple parallel processing lanes controlled by the bit values of the vector predicate. Setting a bit value corresponding to a vector element at a given index causes that processing lane to be active for the data processing, whilst not setting a bit corresponding to a particular vector element causes that processing lane to be inactive for the data processing. A different vector predicate may be used for each vector processing instruction executed. It is useful to capture predicate information relating to predicated vector instructions when seeking to understand and improve vector utilization. However, capturing the entire vector predicate is expensive. Approaches such as a population count or a 3-way indicator (showing none/some/all bits set) have limitations. For example the inventor has realised that neither a population count nor a 3-way indicator can distinguish between contiguous partial predicates (e.g. due to a short loop in a program) and sparse predicates (e.g. due to a test in a program, perhaps within a loop). Such different causes for the use of partial predicates may point to different courses of action to improve utilization. Hence it is useful when controlling vector processing circuitry by means of a vector predicate in this manner to generate information relating to the set and non-set bits of the vector predicate. For example this information may be gathered over a number of iterations of the vector processing, each of which may have a differently set vector predicate, in order to gather statistics about the manner in which the vector predicate controlled vector processing is being carried out. In this context it has been found to be useful to generate the predicate summary value such that it indicates whether a sparse condition is true or not for the vector predicate. The sparse condition is true when the bit values of the vector predicate comprise a set-bit corresponding to a vector element at a higher index immediately followed by a non-set bit corresponding to a vector element at a lower index. Conversely, the sparse condition is not true when this combination of a set bit at a higher index immediately followed by a non set bit at a lower index is not true. This could for example be true because all bits of the vector predicate are set, because no bits of the vector predicate are set, or because nowhere within the vector predicate is this particular bit combination to be found.

In some embodiments the first value of the predicate summary value indicates that the first value of the predicate summary value indicates that a strict subset of the bit values of the vector predicate are set, wherein the strict subset of set bits is not in a non-contiguous sequence comprising a least significant bit of the vector predicate. The first value of the predicate summary value thus corresponds to a strict subset of the bit values of the vector predicate being set. Accordingly it should be understood that where a "strict subset" is referred to here this means that this corresponds to less than all of the bit values of the vector predicate being set. This should be compared to the use of the term "subset of the multiple parallel processing lanes" used above to describe those lanes which are activated, meaning that it is possible for all of the multiple parallel processing lanes of the vector processing circuitry to be active when all bit values of the vector predicate are set. Further, the first value of the predicate summary value indicates that the strict subset of set bits is not a continuous sequence comprising a least significant bit of the vector predicate. Accordingly, if the strict subset of setbits is a contiguous sequence of set-bits then this may not comprise the least significant bit of the vector predicate for the first value of the predicate value summary to be generated.

Conversely in some embodiments the second value of the predicate summary value indicates that a strict subset of the bit values of the vector predicate are set in a contiguous sequence.

Furthermore in some embodiments the predicate monitoring circuitry is responsive to the vector predicate to generate the predicate summary value having the second value when the contiguous sequence comprises a least significant bit of the vector predicate. Accordingly when the strict subset of the bit values of the vector predicate are set in a contiguous sequence, and this contiguous sequence comprises the least significant bit of the vector predicate, then the predicate monitoring circuitry generates the second value of the predicate summary value.

Other predicate summary values may also be defined in addition and in some embodiments the predicate monitoring circuitry is responsive to the vector predicate to generate the predicate summary value having a third value of the predicate summary value when no bit values of the vector predicate are set and having a fourth value when all bit values of the vector predicate are set.

It may be the case that these four values are the only predicate summary values of interest and this output may be efficiently represented in only two bit values and accordingly in some example embodiments the predicate monitoring circuitry is arranged to generate the predicate summary value as a 2-bit value.

In some example embodiments the predicate summary value is autologous. In other words, the particular bit patterns of the predicate summary value chosen to represent particular bit patterns within the vector predicate themselves satisfy the same rules defining those bit patterns of the vector predicate. This property of the predicate summary value may find various applications, for example allowing at least one further vector predicate to be combined with at least one predicate summary value in order for a further predicate summary value to be generated, wherein that further predicate summary value will then accurately represent not only the combination of the at least one further vector predicate and the original predicate summary value, but indeed the combination of the at least one further vector predicate and the original vector predicate. Various processing efficiencies when a summary of multiple vector predicates is to be generated may thereby be achieved.

One particular choice of values of the predicate summary value satisfying this autologous property occurs in embodiments wherein the third value of the predicate summary value is 00, wherein the second value of the predicate summary value is 01, wherein the first value of the predicate summary value is 10, and wherein the fourth value of the predicate summary value is 11.

In some embodiments the predicate monitoring circuitry may subdivide the vector predicate into at least two portions and generate a predicate summary value for each. Accordingly in some embodiments the predicate monitoring circuitry is responsive to the vector predicate to generate a first predicate summary value and at least one further predicate summary value in dependence on the bit values of the vector predicate, wherein the first predicate summary value and the at least one further predicate summary value correspond to a first portion and at least one further portion of the vector predicate.

In some embodiments sizes of the first portion and at the least one further portion of the vector predicate are the same. In some embodiments sizes of the first portion and at the least one further portion of the vector predicate differ.

In addition to generating the predicate summary value the predicate monitoring circuitry may generate other information relating to the vector predicate. For example in some embodiments the predicate monitoring circuitry is further responsive to the vector predicate to generate a predicate count value indicative of a count of set bits in the vector predicate.

The predicate monitoring circuitry may be arranged to return the predicate count value in response to various conditions, but in some embodiments the predicate monitoring circuitry is responsive to a count instruction to return the predicate count value indicative of a count of set bits in the vector predicate.

Accordingly the count instruction may be the trigger which causes the predicate monitoring circuitry to return the predicate count value and in some embodiments the predicate monitoring circuitry may return other information in addition. For example the predicate monitoring circuitry may be further responsive to the count instruction to return the predicate summary value.

Where the apparatus comprises vector processing circuitry it may be useful to monitor the operation of the vector processing circuitry in various ways. Accordingly in some embodiments the apparatus further comprises vector processing sampling circuitry associated with the vector processing circuitry to generate a vector instruction summary for a vector instruction executed by the vector processing circuitry, wherein the vector processing sampling circuitry comprises the predicate monitoring circuitry.

The vector instruction summary may be generated according to various conditions, but in some example embodiment the vector processing sampling circuitry is responsive to a sample trigger condition to generate the vector instruction summary.

The generation of the predicate summary value with at least one of the first value and the second value may be of particular interest in monitoring the operation of the vector processing circuitry and accordingly in some embodiments the predicate monitoring circuitry further comprises at least one counter to count occurrences of generation of the predicate summary value with at least one of the first value and the second value. Statistics may therefore be gathered on the basis of the at least one counter.

In some such embodiments the predicate monitoring circuitry is responsive to a count summary trigger to output at least one value of the at least one counter. Accordingly the count summary trigger may be variously defined in order to access the value of the at least one counter and make use of such statistics.

In one example herein there is a method comprising: performing vector data processing in a subset of multiple parallel processing lanes determined by bit values of a vector predicate which are set; and generating a predicate summary value in dependence on the bit values of the vector predicate, wherein a first value of the predicate summary value indicates that a sparse condition is true for the vector predicate, the sparse condition being true wherein the bit values of the vector predicate comprise a set more-significant bit immediately followed by a non-set less-significant bit, and a second value of the predicate summary value indicates that the sparse condition is not true for the vector predicate.

In one example herein there is an apparatus comprising: means for performing vector data processing in a subset of multiple parallel processing lanes determined by bit values of a vector predicate which are set; and means for generating a predicate summary value in dependence on the bit values of the vector predicate, wherein a first value of the predicate summary value indicates that a sparse condition is true for the vector predicate, the sparse condition being true wherein the bit values of the vector predicate comprise a set more-significant bit immediately followed by a non-set less-significant bit, and a second value of the predicate summary value indicates that the sparse condition is not true for the vector predicate.

In one example herein there is a computer program for controlling a host data processing apparatus to provide an instruction execution environment comprising: vector processing logic to perform data processing in multiple parallel processing lanes, wherein the data processing is performed in a subset of the multiple parallel processing lanes determined by bit values of a vector predicate which are set; and predicate monitoring logic responsive to the vector predicate to generate a predicate summary value in dependence on the bit values of the vector predicate, wherein a first value of the predicate summary value indicates that a sparse condition is true for the vector predicate, the sparse condition being true when the bit values of the vector predicate comprise a set bit corresponding to a vector element at a higher index immediately followed by a non-set bit corresponding to a vector element at a lower index, and a second value of the predicate summary value indicates that the sparse condition is not true for the vector predicate.

Some particular embodiments are now described with reference to the figures.

Figure 1:
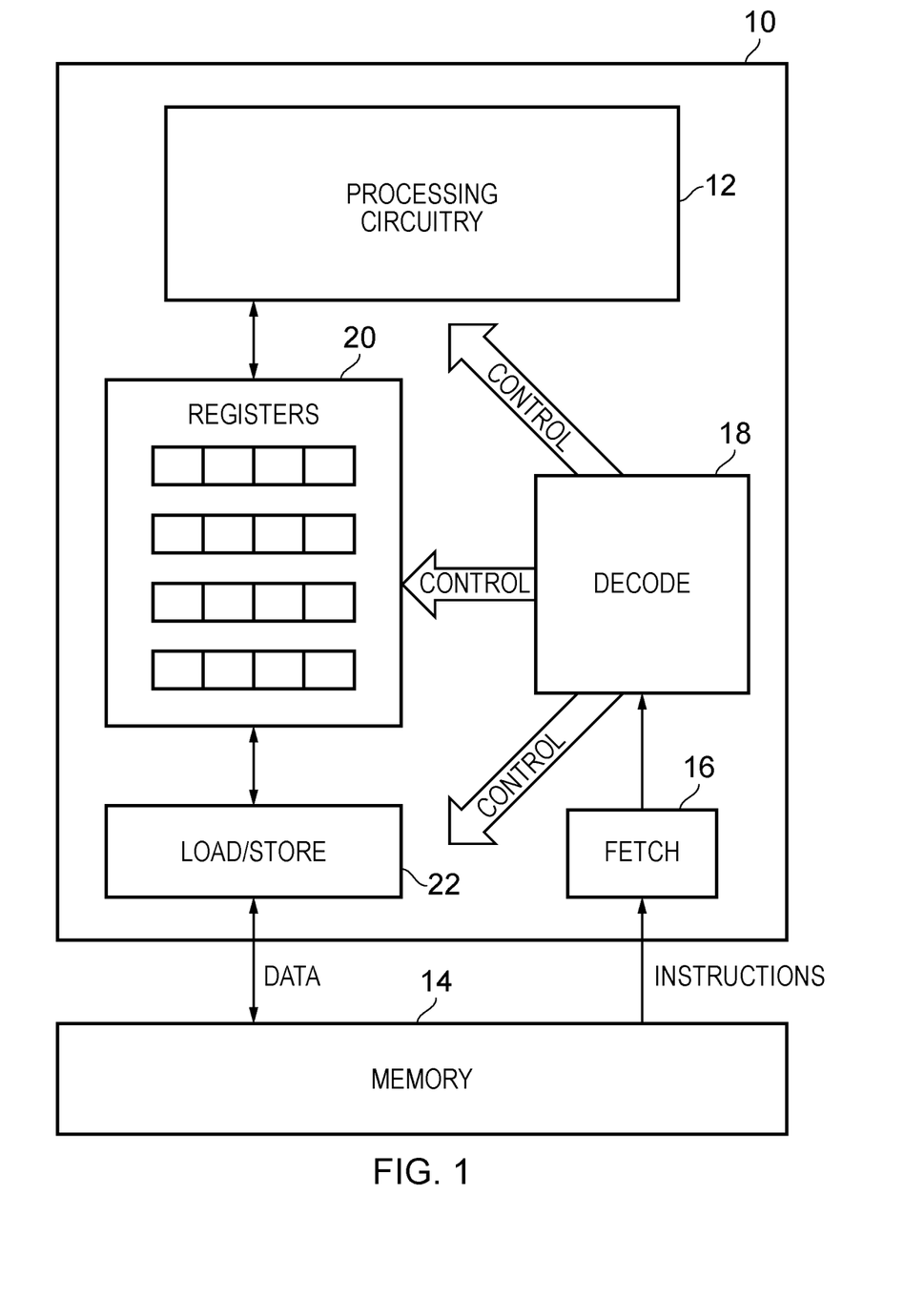
FIG. 1 schematically illustrates the general layout of a data processing apparatus in one example embodiment.

FIG. 1 schematically illustrates a data processing apparatus 10 which may embody various examples of the present techniques. The apparatus comprises data processing circuitry 12 which performs data processing operations on data items in response to a sequence of instructions which it executes. These instructions are retrieved from the memory 14 to which the data processing apparatus has access and, in a manner with which one of ordinary skill in the art will be familiar, fetch circuitry 16 is provided for this purpose. Furthermore, instructions retrieved by the fetch circuitry 16 are passed to the instruction decoder circuitry 18, which generates control signals which are arranged to control various aspects of the configuration and operation of the processing circuitry 12, as well as of a set of registers 20 and a load/store unit 22. Generally, the data processing circuitry 12 may be arranged in a pipelined fashion, yet the specifics thereof are not relevant to the present techniques. One of ordinary skill in the art will be familiar with the general configuration which FIG. 1 represents and further detailed description thereof is dispensed herewith merely for the purposes of brevity. The registers 20, as can be seen in FIG.

1, each comprise storage for multiple data elements, such that the processing circuitry can apply data processing operations either to a specified data element within a specified register, or can apply data processing operations to a specified group of data elements (a "vector") within a specified register. In particular the illustrated data processing apparatus is concerned with the performance of vectorised data processing operations, and specifically to the execution of vector instructions with respect to data elements held in the registers 20, the execution of which is dependent on a vector predicate which controls which vector processing lanes are active, further explanation of which will follow in more detail below with reference to some specific embodiments. Data values required by the data processing circuitry 12 in the execution of the instructions, and data values generated as a result of those data processing instructions, are written to and read from the memory 14 by means of the load/store unit 22. Note also that generally the memory 14 in FIG. 1 can be seen as an example of a computer-readable storage medium on which the instructions of the present techniques can be stored, typically as part of a predefined sequence of instructions (a "program"), which the processing circuitry then executes. The processing circuitry may however access such a program from a variety of different sources, such in RAM, in ROM, via a network interface, and so on.

Figure 2A:
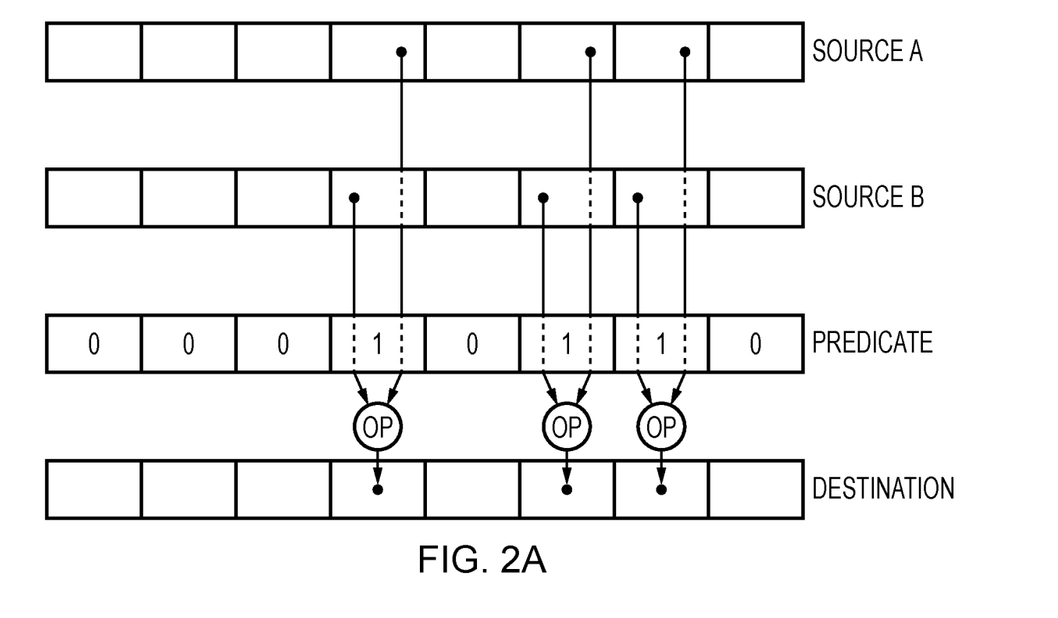
FIG. 2A schematically illustrates vector processing being carried out on two source vectors to generate a destination vector wherein only those lanes for which a corresponding bit value of a vector predicate is set are active.

FIG. 2A schematically illustrates vector processing circuitry which may for example be present in the processing circuitry 12 of the apparatus 10 shown in FIG. 1. Two source vector registers A and B are shown from which elements are taken and form inputs to a specified operation "OP", the result of which is written into corresponding elements of a destination vector register. It should be noted in particular that a vector predicate is also shown and the setting of the bits in this vector predicate controls which "lanes", i.e. which respective elements of the source and destination registers, are involved in the vector processing. In the example shown three bits are set in the 8-bit vector predicate and therefore three corresponding operations are performed on three corresponding pairs of elements taken from the source vector registers A and B producing three results for respective elements of the destination vector register. It should further be noted that in the example of FIG. 2A 8-element vector registers and an 8-bit vector predicate are shown, but the present techniques are in no way limited to a particular size of vector register or vector predicate.

Figure 2B:
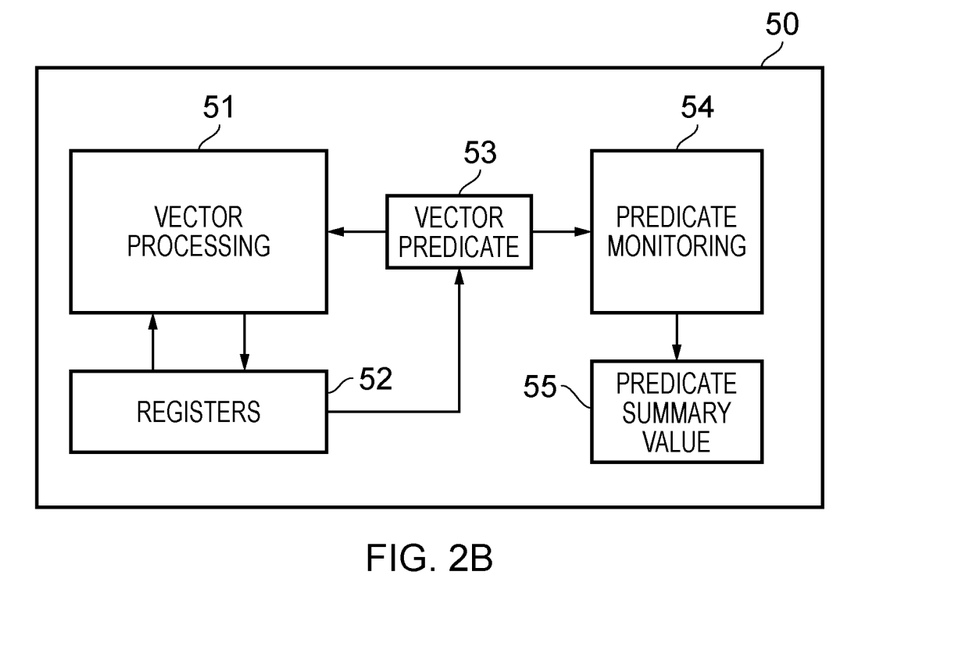
FIG. 2B schematically illustrates an apparatus in accordance with the one example embodiment.

FIG. 2B schematically illustrates an apparatus 50 in one example embodiment. The apparatus 50 comprises vector processing circuitry 51 which is arranged to perform data processing in multiple parallel processing lanes (as is for example illustrated in FIG. 2A) and for this purpose makes access to vector registers within the registers 52. Accordingly source vector registers are accessed within the registers 52 to form the input of data processing operations and result values generated as a result of those operations are written into destination vector registers of the registers 52. A vector predicate 53 is also shown as being retrieved from the registers 52 and passed to the vector processing circuitry 51. It should be noted that this choice of illustration is to highlight the use of the vector predicate 53 and it is not necessary for the vector predicate to be separately stored outside the vector processing circuitry 51 and the registers 52. However this illustration facilitates the understanding of the nature of the predicate 53, its influence on the vector processing circuitry 51, and the fact that this value is also received by predicate monitoring circuitry 54. The predicate monitoring circuitry 54 is arranged to receive the vector predicate 53 and in dependence on the setting of the bits within the vector predicate to generate a predicate summary value 55. The particular manner in which the predicate summary value 55 depends on the vector predicate 53 may vary and accordingly the processing performed by the predicate monitoring circuitry 54. Different examples of this are described below with reference to the figures that follow.

Figure 3A:
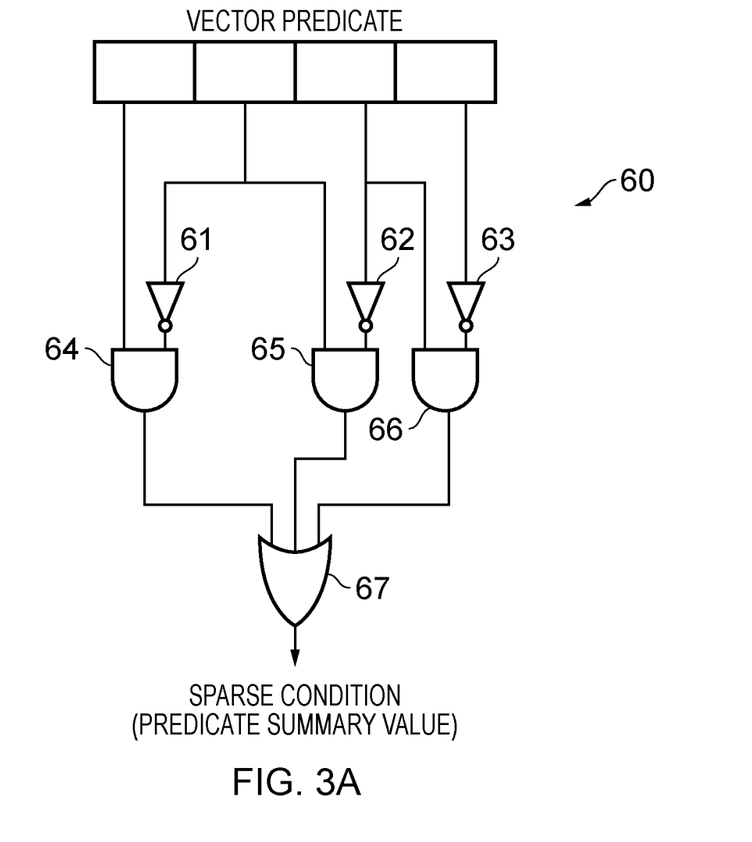
FIG. 3A schematically illustrates predicate monitoring circuitry to generate a predicate summary value representing a sparse condition in one example embodiment.
Figure 3B:
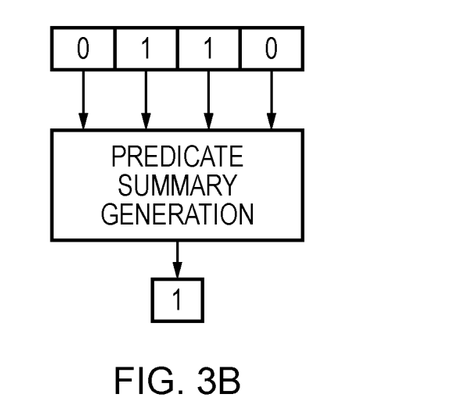
FIG. 3B shows the generation of a predicate summary value in an example embodiment when a sparse condition is true.
Figure 3C:
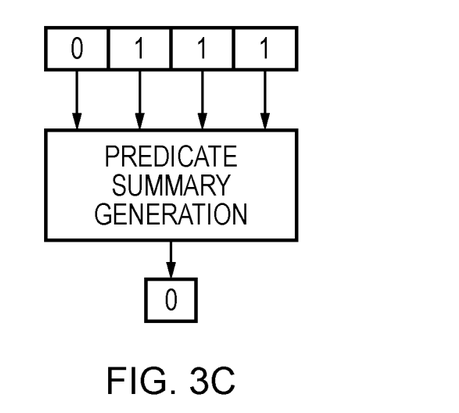
FIG. 3C shows the generation of a predicate summary value when a sparse condition is not true.

FIG. 3A schematically illustrates one example of the configuration of predicate monitoring circuitry 60. The inputs for this circuitry are provided by the respective elements of the vector predicate, which in this example shows only 4 elements merely for clarity of illustration. The predicate monitoring circuitry 60 comprises a set of three NOT gates 61, 62, 63 and a set of AND gates 64, 65, 66. A final OR gate 67 combines the outputs from the three AND gates. The output is an example of a predicate summary value which in this example corresponds directly to a "sparse condition" indicator. Examination of the gate structure of FIG. 3A shows that for the sparse condition to be true the bit values of the vector predicate must be such that a bit corresponding to a vector element at a higher index (further left in FIG. 3A) must be set and immediately followed (reading to the right in FIG. 3A) by a bit corresponding to a vector element at a lower index which is not set. Alternatively put, and viewing the further left bits of the vector predicate as "more significant" and the further right bits of the vector predicate as "less significant" the sparse condition requires that the bit values of the vector predicate comprise a set more significant bit immediately followed by a non-set less significant bit (and the output from the OR gate 67 is 1). If this arrangement of bits is not fulfilled then the sparse condition is not true (and the output of the circuitry from OR gate 67 is 0). FIG. 3B illustrates an example setting of bits in the vector predicate for which the sparse condition is true, whilst FIG. 3C shows an example of the setting of the bits in the vector predicate for which the sparse condition is not true.

Figure 4A:
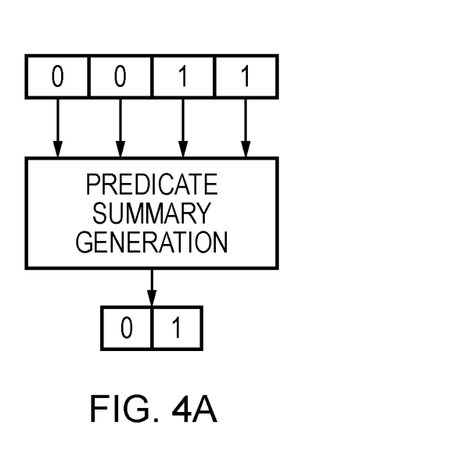
FIGS. 4A, 4B, 4C, and 4d show the generation of a predicate summary value for examples of vector predicates resulting in four different possible predicate summary values in a 2-bit example embodiment.
Figure 4B:
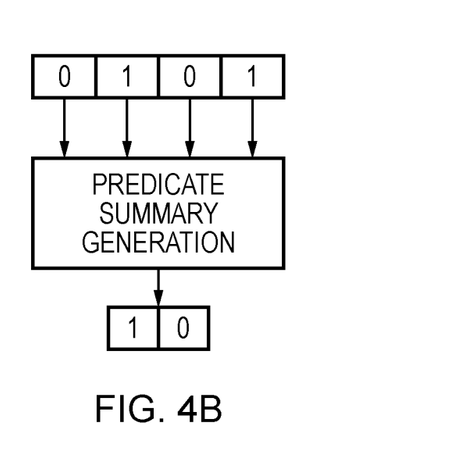
Figure 4C:
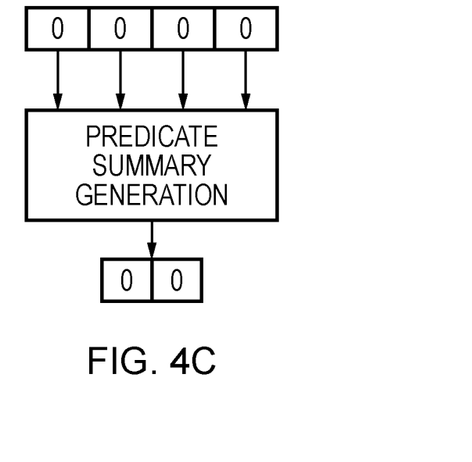
Figure 4D:
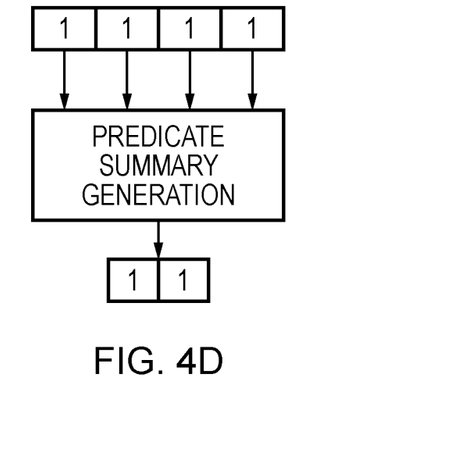

FIGS. 4A-4D illustrate a further example configuration of the predicate summary generation circuitry (as part of predicate monitoring circuitry) according to a 2-bit output configuration, where each of the 4 possible bit patterns of the output represent different identified states of the set bits of the vector predicate. FIG. 4A shows an example in which some, but not all, bits of the vector predicate are set and moreover these are contiguous from the lower (right hand) end. FIG. 4B shows an example in which some (but not all) bits are set, these bits being sparse (not contiguously from the lower (right hand)) end. FIG. 4C shows an example in which no bits are set. FIG. 4D shows an example in which all bits are set. It is further to be noted with reference to FIG. 4A to 4D that the particular 2-bit patterns (encodings) used additionally have the property of being autological, i.e. the predicate summary values have the same property that they indicate. In other words, in the example of 4A, the output "01" satisfies the definition according to which that output was generated, namely that some but not all bits are set and the set bits are contiguous from the low end. In FIG. 4B the output "10" satisfies the definition that some bits are set, but sparsely (not contiguously from the low end). The output in FIG. 4C of "00" satisfies the definition that no bits are set. The output in FIG. 4D of "11" satisfies the definition that all bits are set. This property of the encoding has the additional advantage that a predicate summary value can be generated by applying the same predicate summary value generation rules to any concatenation of vector predicates, portions of vector predicates or predicate summary values.

For example, a vector predicate of:

0001111100110011 has a predicate summary value of "10" (since it is sparse).

This vector predicate may however also be presented in two parts as:

00011111 which has a predicate summary value of "01" (since some bits are set, contiguously from the lower end); and 00110011 which has a predicate summary value of "10" (since some bits are set, but sparsely.

Concatenated, those two predicate summary values give "0101" which itself is sparse, and itself generates a predicate summary value of "10".

Figure 5A:
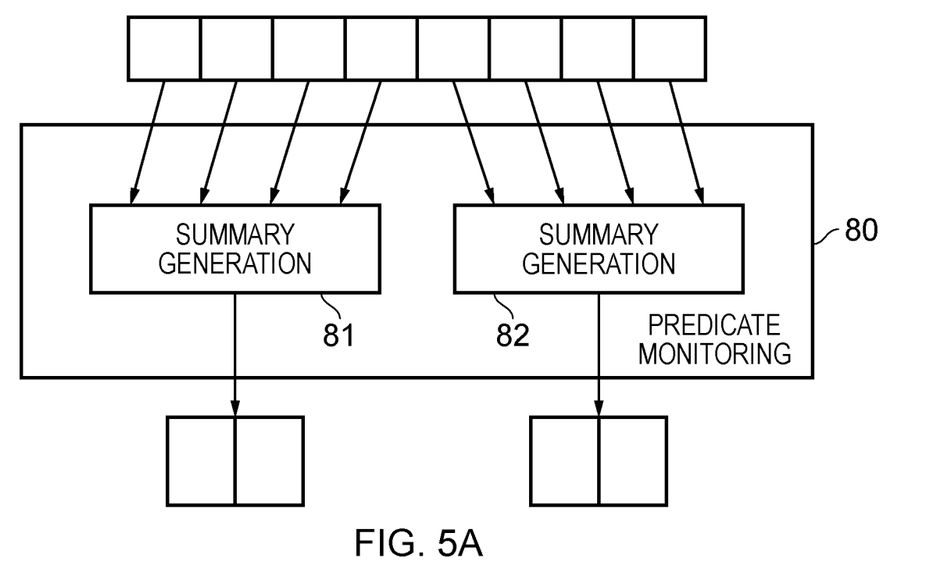
FIG. 5A schematically illustrates predicate monitoring circuitry arranged to generate first and second predicate summary values for two equally sized portions of a vector predicate in an example embodiment.
Figure 5B:
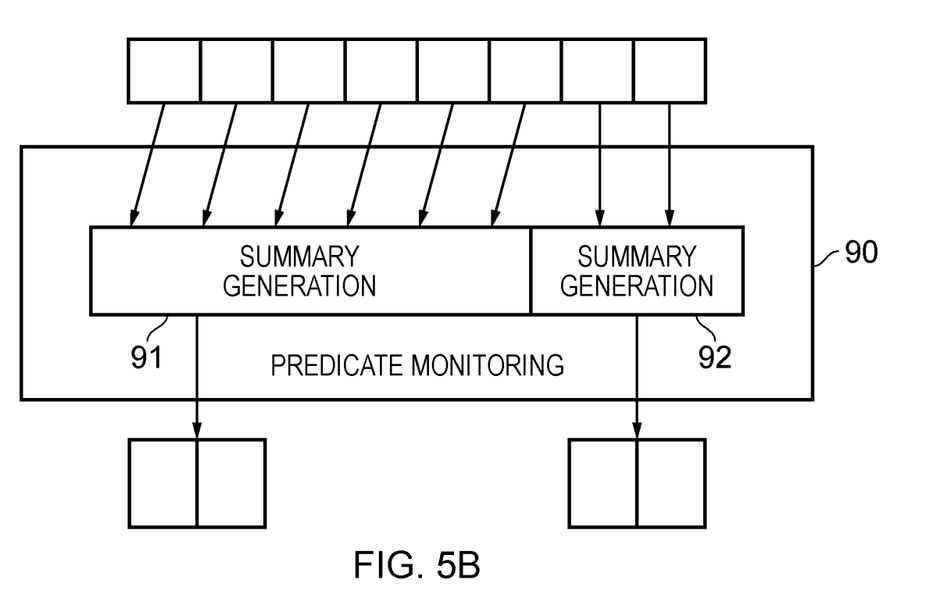
FIG. 5B schematically illustrates predicate monitoring circuitry arranged to generate first and second predicate summary values for first and second portions of a vector predicate which differ in size in an example embodiment.

FIG. 5A schematically illustrates predicate monitoring circuitry 80 in which the input of a vector predicate is split into two portions, for each of which a predicate summary value is generated by respective summary generation circuitry 81 and 82. FIG. 5B schematically illustrates a similar arrangement in which the input vector predicate is split into portions, for each of which a predicate summary value is generated, but the predicate monitoring circuitry 90 of FIG. 5B differs from the predicate monitoring circuitry 80 of 5A in that whilst the input vector predicate to the predicate monitoring circuitry 80 in FIG. 5A splits the vector predicate into two equally sized portions (each being four elements of an 8-element vector in the example shown) the predicate monitoring circuitry 90 in FIG. 5B splits the vector predicate into two differently sized portions (a 6-element portion and a 2-element portion in the example shown). Further with regard to FIG. 5A and FIG. 5B it should be noted that both of the summary generation circuitry instances in each example of the predicate monitoring circuitry need not be active and accordingly a predicate summary value may be generated for sub-portions of a vector predicate alone.

Figure 6:
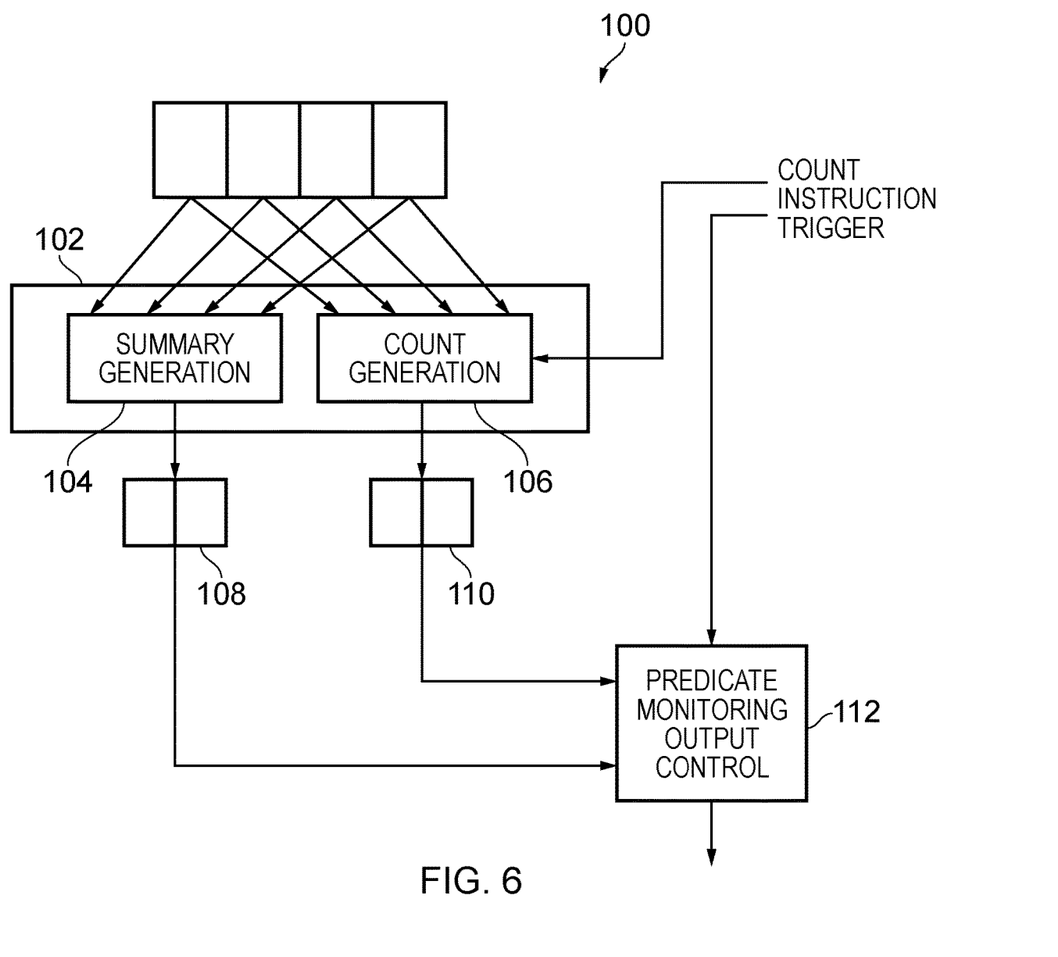
FIG. 6 schematically illustrates predicate monitoring circuitry in one example embodiment, arranged to generate a predicate summary value and a count of set bits in a vector predicate.

FIG. 6 schematically illustrates an apparatus 100 in one example embodiment. Here the predicate monitoring circuitry 102 not only comprises predicate summary value generation circuitry 104, but also count generation circuitry 106. The summary generation circuitry 104 is arranged to generate a predicate summary value 108 (as discussed above), whilst the count generation circuitry 106 is arranged to generate a predicate count value 110 indicative of a count of the number of bits which are set in the vector predicate. Operation of the count generation circuitry 106 may be optional and in such an example may be triggered by a count instruction received by the apparatus, for example as one of the instructions fetched from memory 14 by fetch unit 16 in the example of FIG. 1. This count instruction trigger may also be received by predicate monitoring output control 112 which determines what the output of the predicate monitoring circuitry will be. Accordingly the predicate monitoring output control 112 receives the output of both the summary generation circuitry 104 and the count generation circuitry 106, i.e. the predicate summary value 108 and the predicate count value 110 respectively. For example therefore when the count generation circuitry is not active the predicate monitoring output control may cause only the predicate summary value to be provided as the output, whereas in response to the count instruction trigger the predicate monitoring output control circuitry 112 may additionally provide the predicate count value as part of the output.

Figure 7:
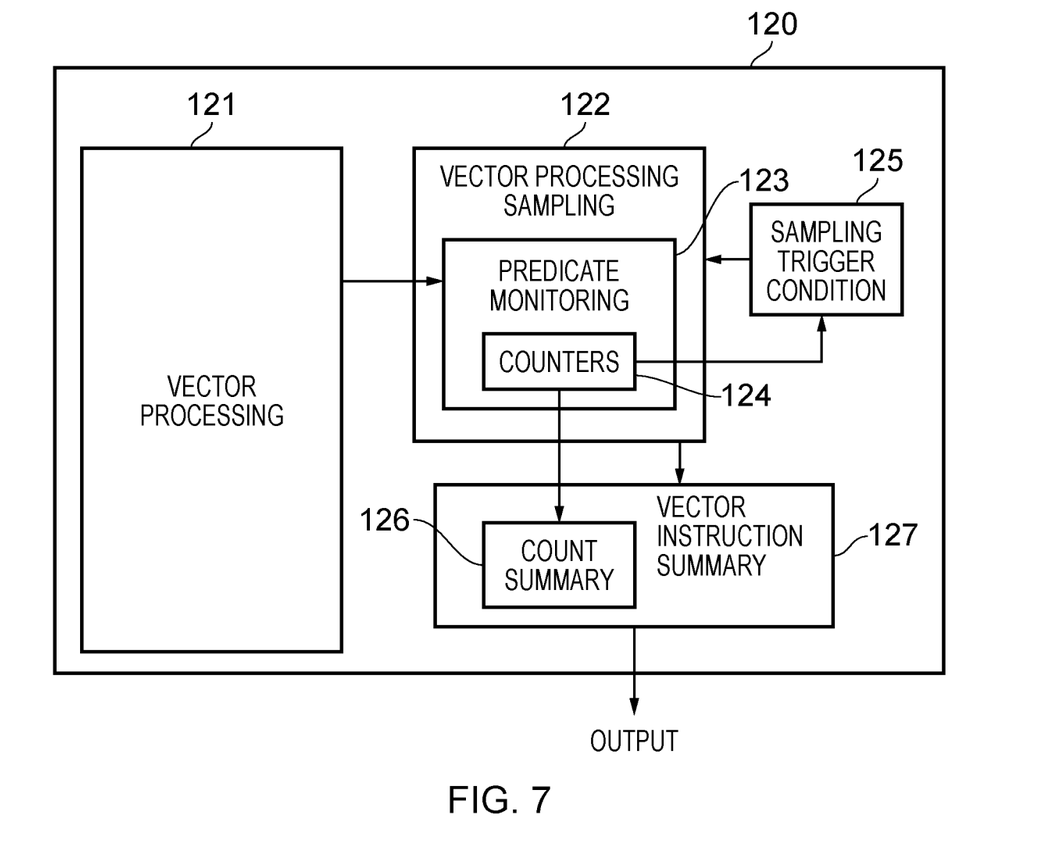
FIG. 7 schematically illustrates vector processing sampling circuitry associated with vector processing circuitry arranged to generate a vector instruction summary in one example embodiment.

FIG. 7 schematically illustrates apparatus 120 in one example embodiment. Vector processing circuitry 121 has associated vector processing sampling circuitry 122 provided, which is arranged to monitor the operation of the vector processing circuitry and to provide a vector instruction summary 127 allowing an understanding of the operation of the vector processing circuitry. In particular, the vector processing sampling circuitry comprises predicate monitoring circuitry 123 which may be configured in accordance with any of the above described examples. Capturing predicate information relating to the vector predicates used in the operation of the vector processing circuitry 112 is useful to help understand vector utilisation. However, capturing the entire predicate for each vector operation performed is expensive and for this reason the predicate monitoring circuitry 123 is arranged to generate a predicate summary value which forms part or all of the vector instruction summary.

The predicate monitoring circuitry further comprises counters 124 which are configured to count occurrences of the generation of particular predicate summary values. In this example the counters 124 are provided as two counters to count occurrences of generation of the predicate summary value in accordance with the 2-bit configuration described with respect to FIGS. 4A-4D. More particularly the two counters provided count occurrences of generation of the predicate value with the output value "01", i.e. when some but not all bits are set and they are contiguous from the low end, and occurrences of generation of the predicate summary value with the value "10", i.e. where some bits are set but these are sparse (not contiguous from the low end). This enables a distinction to be made between contiguous partial predicates due to a short loop and sparse predicates due to a test in the loop. Capturing this information can point to different causes of use of the vector predicates and may point to a different course of action to improve utilisation. The vector processing sampling 122 can be responsive to a sampling trigger condition 125 which may be variously defined in dependence on the system requirements. However, in the example illustrated, the sampling trigger condition is met when at least one of the counters 124 reaches a threshold value. In response to this the counters 124 generate a count summary 126 which can then form part of the vector instruction summary 127 which forms the output. This output may be used within the apparatus 120 or passed to another part of the system for analysis, storage, and/or actions to be taken in response.

Figure 8:
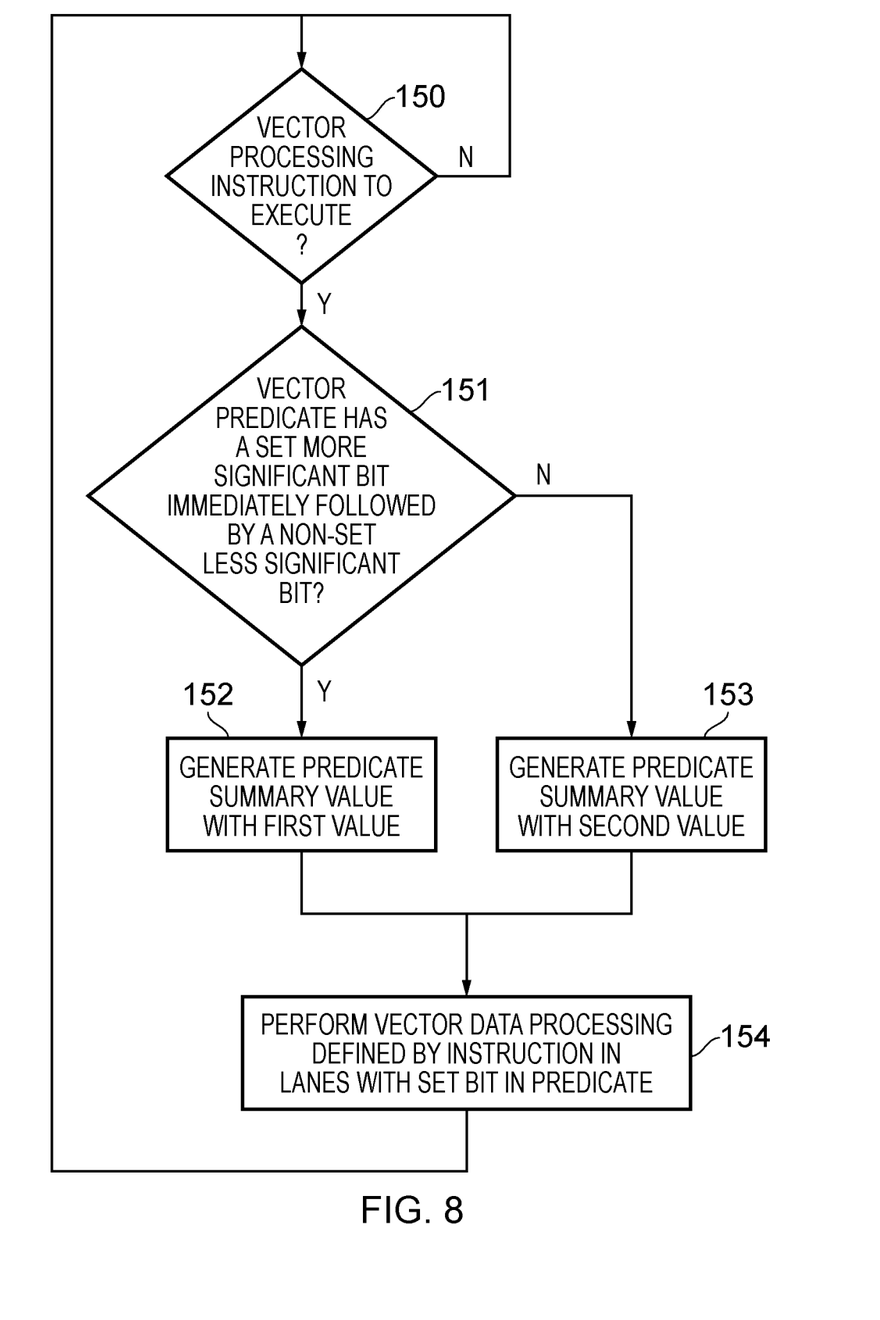
FIG. 8 is a flow diagram showing a sequence of steps taken according to the method of one example embodiment.

FIG. 8 is a flow diagram showing a sequence of steps which are taken according to the method of one example embodiment. The flow can be considered to begin at step 150 where it is determined if there is vector processing instruction to execute. The method illustrated is only concerned with such a vector processing and therefore whilst this is not true the flow loops on itself at step 150. However when this is true the flow proceeds to step 151 where it is determined if the vector predicate has a set more significant bit immediately followed by a non-set less significant bit. In other words, it is determined if the bit values of the vector predicate comprise a set bit corresponding to a vector element at a higher index immediately followed by a non-set bit corresponding to a vector element at a lower index. If this is true then the predicate summary value is generated with a first value at step 152, while if this is not true then the predicate summary value is generated with a second value at step 153. The first and second values may for example be "10" and "01" in accordance with one of the examples given above. This particular encoding is however not necessary. Finally at step 154 the vector data processing defined by the instruction is carried out in those lanes which have a set bit in the vector predicate. The flow then returns to step 150.

Figure 9:
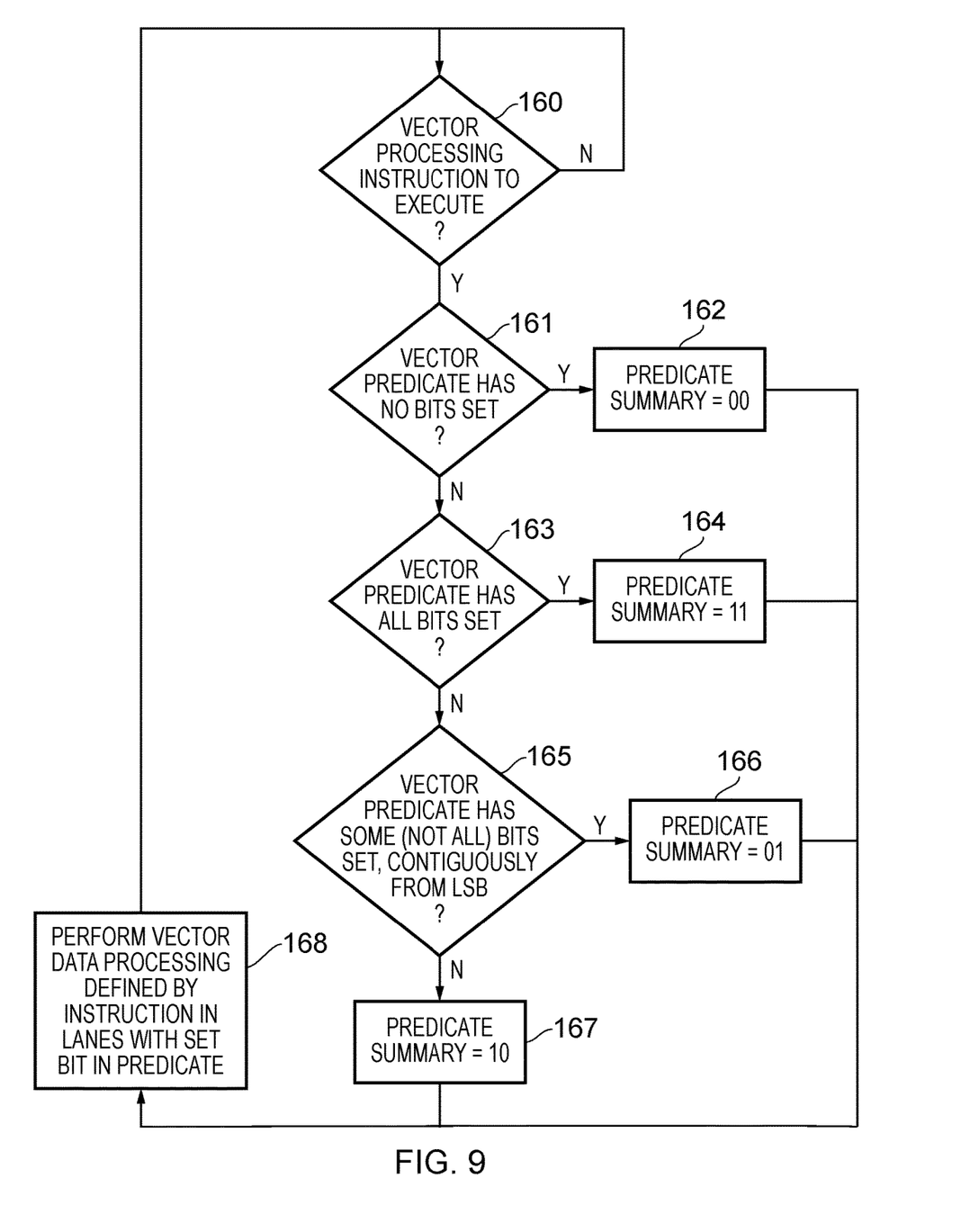
FIG. 9 is a flow diagram showing a sequence of steps which are taken according to the method of one example embodiment.

FIG. 9 is a flow diagram showing the sequence of steps which are taken in accordance with one example embodiment. The flow can be considered to begin at step 160 where it is determined if there is a vector processing instruction to execute. Whilst this is not true the flow loops upon itself at step 160. However when this is the case then the flow proceeds to step 161 where it is determined if the vector predicate has no bits set. If this is true then at step 162 the predicate summary value is generated as a "00". Otherwise the flow proceeds to step 163 where it is determined if the vector predicate has all bits set. If this is true then at step 164 the predicate summary value is output as "11". Otherwise at step 165 it is determined if the vector predicate has some, but not all, bits set, these being contiguous from the lower index end (i.e. the least significant bit end of the vector predicate). If this is true then at step 166 the predicate summary value is generated as "01". Otherwise at step 167 the predicate summary value is generated as "10" indicating that some bits are set but these are sparse i.e. not contiguous from the lower end. Via whichever route the predicate summary value is set the flow then leads to step 168 where the vector data processing is performed as defined by the vector processing instruction being carried out in those lanes which have a set bit in the predicate. The flow then returns to step 160.

Figure 10:
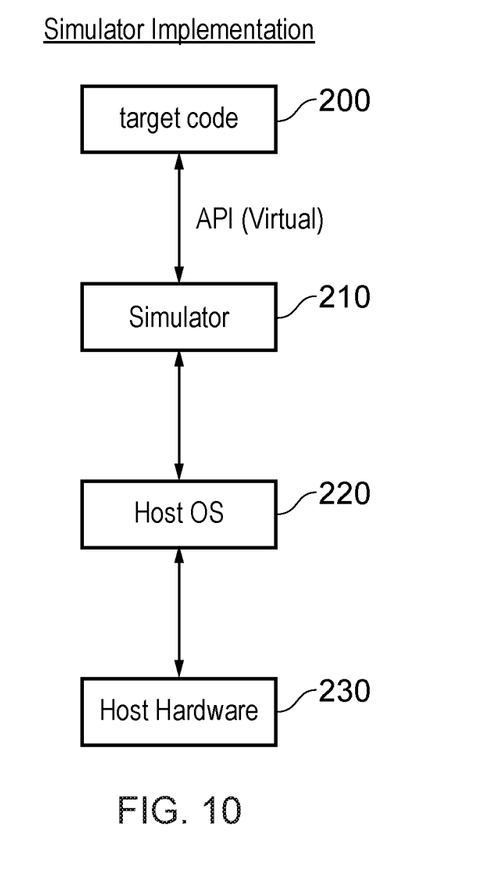
FIG. 10 schematically illustrates a simulator implementation in example embodiments.

FIG. 10 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium (which may be a non-transitory medium), and provides a program interface (instruction execution environment) to the target code 200 which is the same as the application program interface of the hardware architecture being modelled by the simulator program 210. Thus, the program instructions of the target code 200, including vector processing instructions to be executed by simulated vector processing circuitry, may be executed from within the instruction execution environment using the simulator program 210, so that a host computer 230 which does not actually have the hardware features of the apparatus examples discussed above can emulate these features.

In brief overall summary, apparatuses and methods of operating such apparatuses are disclosed. Vector processing circuitry performs data processing in multiple parallel processing lanes, wherein the data processing is performed in a subset of the multiple parallel processing lanes determined by bit values of a vector predicate which are set. Predicate monitoring circuitry is responsive to the vector predicate to generate a predicate summary value in dependence on the bit values of the vector predicate. A first value of the predicate summary value indicates that a sparse condition is true for the vector predicate, the sparse condition being true when the bit values of the vector predicate comprise a set bit corresponding to a vector element at a higher index immediately followed by a non-set bit corresponding to a vector element at a lower index. A second value of the predicate summary value indicates that the sparse condition is not true for the vector predicate. Improved predicate controlled vector processing is thus supported.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
 vector processing circuitry to perform data processing in multiple parallel processing lanes, wherein the data processing is performed in a subset of the multiple parallel processing lanes determined by bit values of a vector predicate which are set; and
 predicate monitoring circuitry responsive to the vector predicate to generate a predicate summary value in dependence on the bit values of the vector predicate; wherein:
 the predicate monitoring circuitry is configured to determine that a sparse condition is true in response to determining that the bit values of the vector predicate comprise a set bit corresponding to a vector element at a higher index immediately followed by a non-set bit corresponding to a vector element at a lower index, a first value of the predicate summary value indicates that the sparse condition is true for the vector predicate, and a second value of the predicate summary value indicates that the sparse condition is not true for the vector predicate.

2. The apparatus as claimed in claim 1, wherein the first value of the predicate summary value indicates that a strict subset of the bit values of the vector predicate are set, wherein the strict subset of set bits is not a contiguous sequence comprising a least significant bit of the vector predicate.

3. The apparatus as claimed in claim 1, wherein the second value of the predicate summary value indicates that a strict subset of the bit values of the vector predicate are set in a contiguous sequence.

4. The apparatus as claimed in claim 3, wherein the predicate monitoring circuitry is responsive to the vector predicate to generate the predicate summary value having the second value when the contiguous sequence comprises a least significant bit of the vector predicate.

5. The apparatus as claimed in claim 1, wherein the predicate monitoring circuitry is responsive to the vector predicate to generate the predicate summary value having a third value of the predicate summary value when no bit values of the vector predicate are set and having a fourth value when all bit values of the vector predicate are set.

6. The apparatus as claimed in claim 5, wherein the predicate monitoring circuitry is arranged to generate the predicate summary value as a 2-bit value.

7. The apparatus as claimed in claim 6, wherein the predicate summary value is autologous.

8. The apparatus as claimed in claim 6, wherein the third value of the predicate summary value is 00, wherein the second value of the predicate summary value is 01, wherein the first value of the predicate summary value is 10, and wherein the fourth value of the predicate summary value is 11.

9. The apparatus as claimed in claim 1, wherein the predicate monitoring circuitry is responsive to the vector predicate to generate a first predicate summary value and at least one further predicate summary value in dependence on the bit values of the vector predicate, wherein the first predicate summary value and the at least one further predicate summary value correspond to a first portion and at least one further portion of the vector predicate.

10. The apparatus as claimed in claim 9, wherein sizes of the first portion and the at least one further portion of the vector predicate are the same.

11. The apparatus as claimed in claim 9, wherein sizes of the first portion and the at least one further portion of the vector predicate differ.

12. The apparatus as claimed in claim 1, wherein the predicate monitoring circuitry is further responsive to the vector predicate to generate a predicate count value indicative of a count of set bits in the vector predicate.

13. The apparatus as claimed in claim 12, wherein the predicate monitoring circuitry is responsive to a count instruction to return the predicate count value indicative of a count of set bits in the vector predicate.

14. The apparatus as claimed in claim 13, wherein the predicate monitoring circuitry is further responsive to the count instruction to return the predicate summary value.

15. The apparatus as claimed in claim 1, comprising vector processing sampling circuitry associated with the vector processing circuitry to generate a vector instruction summary for a vector instruction executed by the vector processing circuitry, wherein the vector processing sampling circuitry comprises the predicate monitoring circuitry.

16. The apparatus as claimed in claim 15, wherein the vector processing sampling circuitry is responsive to a sample trigger condition to generate the vector instruction summary.

17. The apparatus as claimed in claim 1, wherein the predicate monitoring circuitry further comprises at least one counter to count occurrences of generation of the predicate summary value with at least one of the first value and the second value.

18. The apparatus as claimed in claim 17, wherein the predicate monitoring circuitry is responsive to a count summary trigger to output at least one value of the at least one counter.

19. A method comprising:
performing vector data processing in a subset of multiple parallel processing lanes determined by bit values of a vector predicate which are set; and
generating a predicate summary value in dependence on the bit values of the vector predicate,
wherein a sparse condition is determined to be true in response to determining that the bit values of the vector predicate comprise a set bit corresponding to a vector element at a higher index immediately followed by a non-set bit corresponding to a vector element at a lower index;
a first value of the predicate summary value indicates that the sparse condition is true for the vector predicate,
and a second value of the predicate summary value indicates that the sparse condition is not true for the vector predicate.

20. A non-transitory storage medium storing a computer program for controlling a host data processing apparatus to provide an instruction execution environment comprising:
vector processing logic to perform data processing in multiple parallel processing lanes, wherein the data processing is performed in a subset of the multiple parallel processing lanes determined by bit values of a vector predicate which are set; and
predicate monitoring logic responsive to the vector predicate to generate a predicate summary value in dependence on the bit values of the vector predicate,
wherein the predicate monitoring logic is configured to determine that a sparse condition is true in response to determining that the bit values of the vector predicate comprise a set bit corresponding to a vector element at a higher index immediately followed by a non-set bit corresponding to a vector element at a lower index,
a first value of the predicate summary value indicates that a sparse condition is true for the vector predicate,
and a second value of the predicate summary value indicates that the sparse condition is not true for the vector predicate.

* * * * *